United States Patent [19]

Okinoshima et al.

[11] Patent Number: 5,346,979

[45] Date of Patent: Sep. 13, 1994

[54] CURABLE RESIN, PROCESS FOR MAKING AND ELECTRONIC PART PROTECTIVE COATING

[75] Inventors: Hiroshige Okinoshima, Annaka; Hideto Kato, Takasaki, both of Japan

[73] Assignee: Shin-Etsu Chemical Co., Ltd., Tokyo, Japan

[21] Appl. No.: 3,398

[22] Filed: Jan. 12, 1993

[30] Foreign Application Priority Data

Jan. 17, 1992 [JP] Japan ................................. 4-26223

[51] Int. Cl.$^5$ ............................................. C08G 77/26
[52] U.S. Cl. ........................................ 528/26; 528/28; 528/41; 525/431
[58] Field of Search ............................ 528/26, 28, 41; 525/431

[56] References Cited

U.S. PATENT DOCUMENTS

| | | | |
|---|---|---|---|
| 3,288,754 | 11/1966 | Green | 525/431 |
| 4,518,735 | 5/1985 | Goodrich et al. | 524/403 |
| 4,647,630 | 3/1987 | Schmid et al. | 525/431 |
| 4,970,283 | 11/1990 | Kunimune et al. | 528/26 |

*Primary Examiner*—John C. Bleutge
*Assistant Examiner*—Margaret W. Glass
*Attorney, Agent, or Firm*—Birch, Stewart, Kolasch & Birch

[57] ABSTRACT

A novel curable polyimide resin of structural formula (1) or (2) is provided wherein $R^1$ and $R^2$ are independently substituted or unsubstituted monovalent $C_{1-10}$ hydrocarbon groups, $R^3$ is a divalent $C_{1-10}$ organic group, X is a tetravalent organic group containing an aromatic or aliphatic ring, Y is a divalent organic group, Z is a divalent organic group containing an aromatic ring, W is a trivalent organic group containing an aromatic ring, m is an integer of 1 to 3, and n is an integer of at least 1. It can be prepared by reacting a polyimide with a silicon compound. The curable resin forms with a solvent a solution having a low viscosity and shelf stability and cures at relatively low temperatures below 300° C. into coatings having heat resistance, mechanical strength, electrical properties, solvent resistance and substrate adherence.

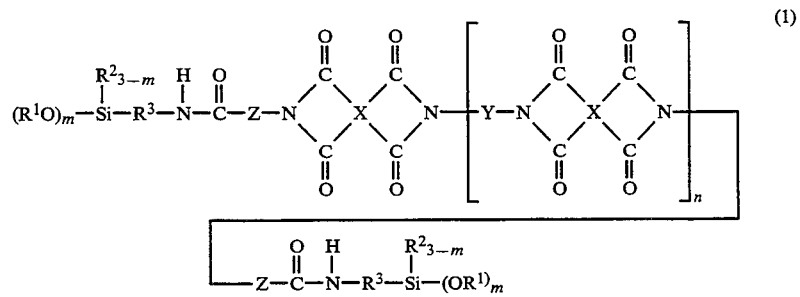

-continued
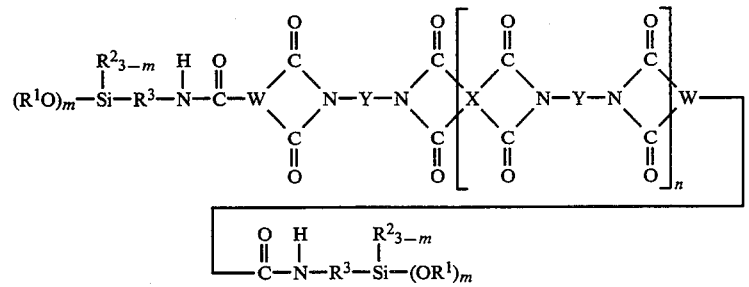
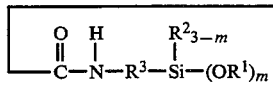
4 Claims, No Drawings

CURABLE RESIN, PROCESS FOR MAKING AND ELECTRONIC PART PROTECTIVE COATING

BACKGROUND OF THE INVENTION

1. Field of the Invention

This invention relates to a curable resin of the polyimide type adapted for use as an insulating protective coating on electronic parts and a process for preparing the curable resin. It also relates to an electronic part protective coating obtained by curing the resin.

2. Prior Art

Polyimide resins having heat resistance and improved electrical and mechanical properties have been utilized as insulating protective coatings for electronic parts. Since most polyimide resins are insoluble in organic solvents, polyimide protective coatings are generally prepared by using a solution of polyamic acid which is a polyimide precursor, and applying the solution to substrates, followed by heat curing. This conventional approach, however, has several problems. For example, the polyamic acid solution has too high viscosity to work with and requires high temperatures above 300° C. for heat curing. Cured polyimide resin coatings show poor adherence to such substrates as nickel, aluminum, silicon, and silicon oxide film.

Many proposals were made for improving the adherence to substrates. Japanese Patent Publication (JP-B) No. 27439/1968 which corresponds to U.S. Pat. No. 3,325,450 and No. 7213/1984 which corresponds to Great Britain Patent No. 1,571,999 propose polyimide-siloxane copolymers in which a diamine component, which is a reactant for forming polyimide, is partially replaced by a siloxane-containing diamine. Also, JP-B 32162/1983 (U.S. Pat. No. 3,950,308), 32163/1983 (U.S. Pat. No. 3,926,911), 266436/1986, 207438/1986 (U.S. Pat. No. 4,672,099), and 29510/1989 discloses methods of mixing or reacting a polyamic acid or polyimide precursor with a silane having an amino group or acid anhydride group. However, the former method had the problem that copolymers showed poor heat resistance due to an increased siloxane content. In the latter method, the polyamic acid solution experienced a substantial loss of shelf stability with an increasing amount of silane added.

It is also proposed to react polyamic acid or polyimide oligomer with an amino group-containing alkoxysilane as disclosed in Japanese Patent Application Kokai (JP - A) Nos. 157427/1981, 157428/1981, 240730/1985 (U.S. Pat. No. 4,609,700) and 266436/1986. These methods also have the problem that the amount of silane added for shelf stability improvements is limited.

For avoiding heat treatment at high temperatures above 300° C. required for curing polyamic acid to form polyimide coatings, it is proposed to dissolve a polyimide resin having a siloxane linkage in a solvent as disclosed in JP-A 83228/1986, 118424/1986 (U.S. Pat. No. 4,586,997) and 118425/1986 (U.S. Pat. No. 4,701,511). Polyimide resin coatings obtained by these techniques are less solvent resistant in nature and thus unacceptable in some practical aspects.

SUMMARY OF THE INVENTION

Therefore, an object of the present invention is to provide a novel and improved curable resin of the polyimide type which can be dissolved in a solvent to form a solution having a low viscosity enough to work with and improved shelf stability and which can cure at relatively low temperature into cured coatings having heat resistance, mechanical strength, electrical properties, solvent resistance and substrate adherence. Further objects of the present invention are to provide a process for preparing the curable resin and a protective coating for electronic parts obtained by curing the resin.

According to a first aspect of the present invention, there is provided a curable resin of the polyimide type having imide and alkoxysilyl groups. It is of the following structural formula (1) or (2):

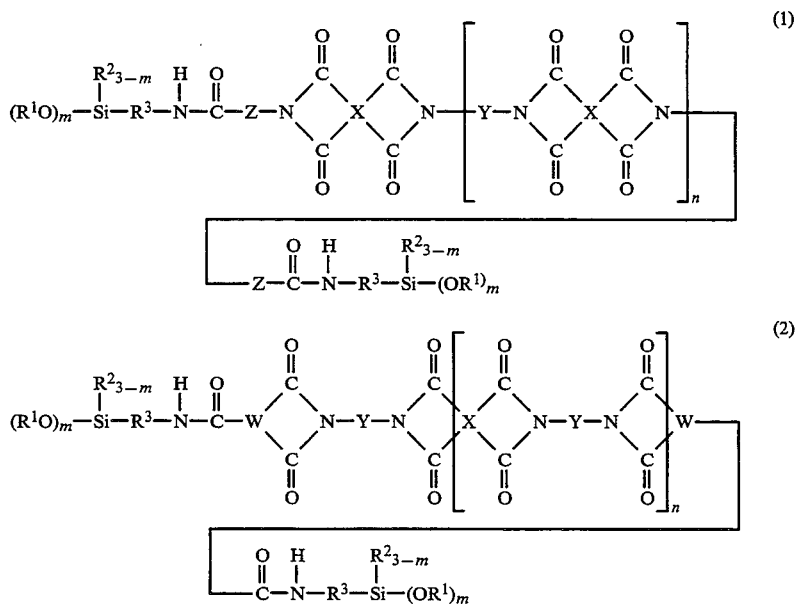

wherein $R^1$ and $R^2$ are independently substituted or unsubstituted monovalent hydrocarbon groups having 1 to 10 carbon atoms, $R^3$ is a divalent organic group having 1 to 10 carbon atoms, X is a tetravalent organic group containing an aromatic or aliphatic ring, Y is a divalent organic group, Z is a divalent organic group containing an aromatic ring, W is a trivalent organic group containing an aromatic ring, m is an integer of 1 to 3, and n is an integer of at least 1.

A second aspect of the present invention is directed to a process for preparing a curable resin of formula (1) or (2). A polyimide of the following structural formula (3) or (4):

wherein $R^1$, $R^2$, $R^3$, and m are as defined above in an organic solvent.

According to a third aspect of the present invention, a cured product of a curable resin of formula (1) or (2) provides a protective coating for electronic parts.

The curable resin of formula (1) or (2) is dissolvable in an organic solvent to form a solution or varnish which is relatively low viscous and thus easy to work with. This varnish is well stable during shelf storage. By heating at relatively low temperatures below 300° C., it readily cures into a coating having heat resistance, mechanical strength and electrical properties. Additionally, the cured coating firmly adheres to the underlying substrate and is fully resistance against solvents. This coating is particularly suitable for use as a protective coating on electronic parts.

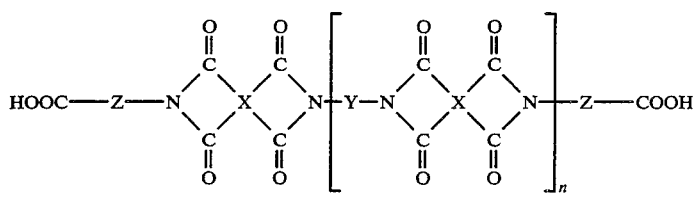

(3)

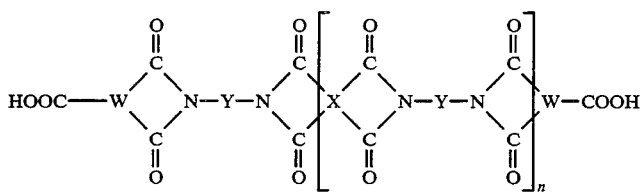

(4)

wherein X, Y, Z, W and n are as defined above is reacted with a silicon compound of the following structural formula (5):

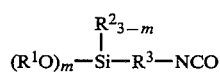

(5)

DETAILED DESCRIPTION OF THE INVENTION

The polyimide type curable resin of the present invention has structural formula (1) or (2).

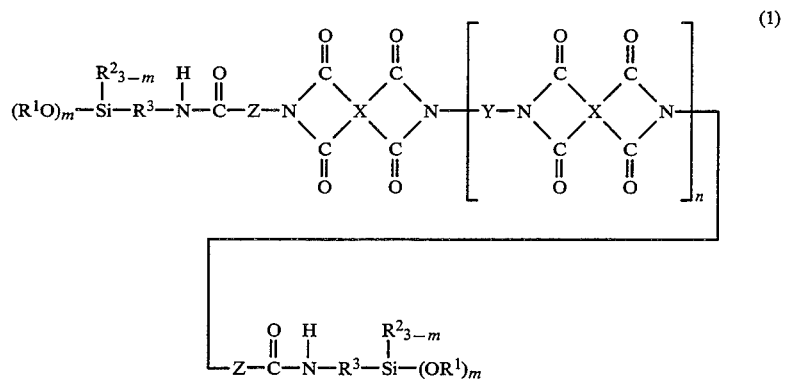

(1)

-continued

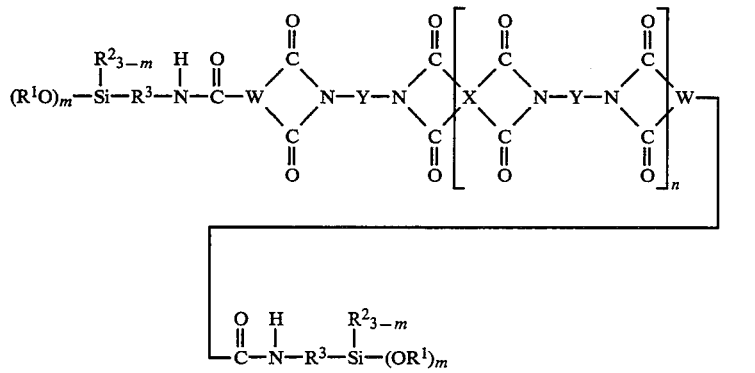
(2)

In formula (1), $R^1$ and $R^2$, which may be identical or different, are substituted or unsubstituted monovalent hydrocarbon groups having 1 to 10 carbon atoms, $R^3$ is a divalent organic group having 1 to 10 carbon atoms, X is a tetravalent organic group containing an aromatic or aliphatic ring, Y is a divalent organic group, Z is a divalent organic group containing an aromatic ring, and W is a trivalent organic group containing an aromatic ring. Letter m is an integer of 1 to 3 and n is an integer of at least 1, preferably 1 to 100 for better workability and adhesion.

The curable resin of formula (1) or (2) can be prepared by reacting a polyimide of structural formula (3) or (4) with a silicon compound (isocyanatosilane) of structural formula (5) in an organic solvent.

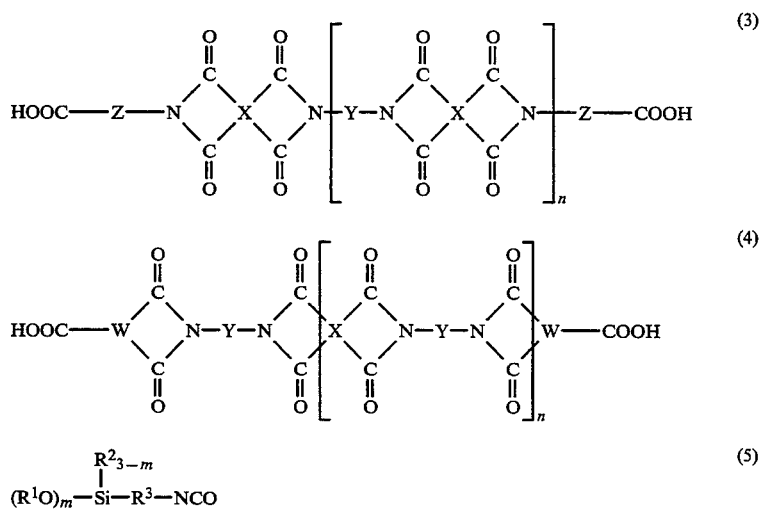

In the formulae, $R^1$, $R^2$, $R^3$, X, Y, Z, W, m and n are as defined above.

The polyimide of formula (3) or (4) can be prepared by reacting a tetracarboxylic dianhydride of structural formula (6) with a diamine of structural formula (7) and an aminocarboxylic acid of structural formula (8) or tricarboxylic anhydride of structural formula (9) in a suitable proportion. For the synthesis of the polyimide of formula (3), n molecules of the diamine of formula (7) and 2 molecules of the compound of formula (8) are available per (n+1) molecules of the tetracarboxylic dianhydride of formula (6). For the synthesis of the polyimide of formula (4), (n+1) molecules of the diamine of formula (7) and 2 molecules of the compound of formula (9) are available per n molecules of the tetracarboxylic dianhydride of formula (6) wherein n is an integer of at least 1. There is formed a polyamic acid which is dehydrated in a conventional manner. Shown below are formulae (6), (7), (8) and (9) wherein X, Y, Z and W are as defined above.

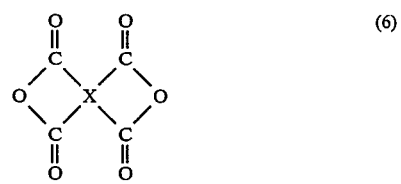
(6)

$H_2N-Y-NH_2$ (7)
$HOOC-Z-NH_2$ (8)

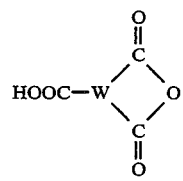
(9)

The reaction schemes representing the moles of the respective reactants are shown below.

$(n+1)\times(6) + n\times(7) + 2\times(8) \rightarrow (3)$ $n\times(6) + (n+1)\times(7) + 2\times(9) \rightarrow (4)$ In the foregoing formulae, X is a tetravalent organic group having an aromatic or aliphatic ring, which originates from the tetracarboxylic dianhydride of formula (6) which is used as a starting reactant to form the polyimide of formula (3) or (4).

The acid dianhydride of formula (6) is often selected from, but not limited to, pyromellitic dianhydride where X is

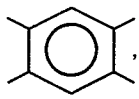

benzophenonetetracarboxylic dianhydride where X is

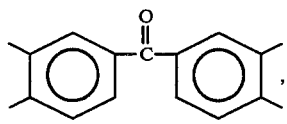

3,3',4,4'- biphenyltetracarboxylic dianhydride where X is

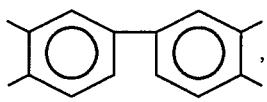

2,2-bis[4-(3,4-dicarboxyphenoxy)phenyl]-propane dianhydride where X is

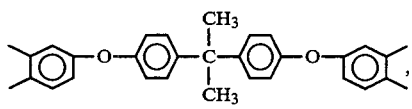

2,2-bis(3,4-benzenedicarboxylic anhydride) perfluoropropane where X is

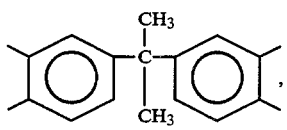

bis(3,4-dicarboxyphenyl)dimethylsilane dianhydride where X is

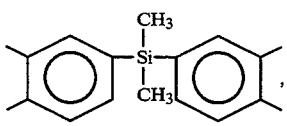

1,3-bis(3,4-dicarboxyphenyl)-1,1,3,3-tetramethyldisiloxane dianhydride where X is

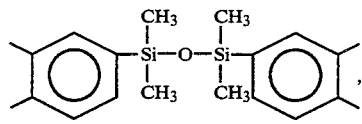

and 1,3-bis[4-(1,2,3,6-tetrahydrophthalic anhydride)]-1,1,3,3-tetramethyldisiloxane where X is

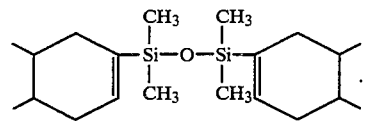

X may be one or a mixture of the foregoing members. Therefore, when a tetracarboxylic dianhydride of formula (6) is reacted with a diamine of formula (7) and a compound of formula (8) or (9) to form a polyamide of formula (3) or (4), either a single dianhydride or a mixture of two or more dianhydrides may be used.

Y is a divalent organic group, which originates from the diamine of formula (7) which is used as a starting reactant to form the polyimide of formula (3) or (4). Illustrative, non-limiting examples of the diamine of formula (7) include aromatic ring-containing diamines, for example, p-phenylenediamine, m-phenylenediamine, 4,4'-diaminodiphenylmethane, 4,4'-diaminodiphenyl ether, 2,2'-bis(4-amino-phenyl)propane, 4,4'-diaminodiphenyl sulfone, 4,4'-diaminodiphenyl sulfide, 1,4-bis(3-aminophenoxy)benzene, 1,4-bis(4-aminophenoxy)benzene, 1,4-bis(m-aminophenylsulfonyl)benzene, 1,4-bis(p-aminophenylsulfonyl)benzene, 1,4-bis(m-aminophenylthioether)benzene, 1,4-bis(p-aminophenylthioether)benzene, 2,2-bis[4-(4-aminophenoxy)phenyl]propane, 2,2-bis[3-methyl-4-(4-aminophenoxy)phenyl]propane, 2,2-bis[3-chloro-4-(4-aminophenoxy)phenyl]propane, 1,1-bis[4-(4-aminophenoxy)phenyl]ethane, 1,1-bis[3-methyl-4-(4-aminophenoxy)phenyl]ethane, 1,1-bis[3-chloro-4-(4-aminophenoxy)phenyl]ethane, 1,1-bis[3,5-dimethyl-4-(4-aminophenoxy)phenyl]ethane, bis[4-(4-aminophenoxy)phenyl]methane, bis[3-methyl-4-(4-aminophenoxy)phenyl]methane, bis[3-chloro-4-(4-aminophenoxy)phenyl]methane, bis[3,5-dimethyl-4-(4-aminophenoxy)phenyl]methane, bis[4-(4-aminophenoxy)phenyl]sulfone, 2,2-bis[4-(4-aminophenoxy)phenyl]perfluoropropane, etc., and silicon diamines as shown below.

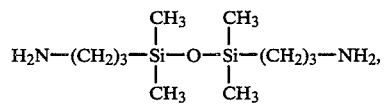

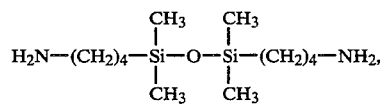

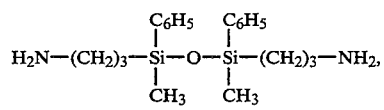

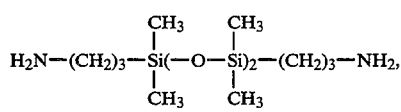

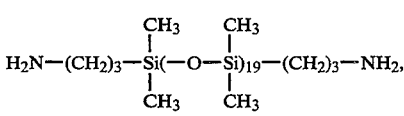

-continued

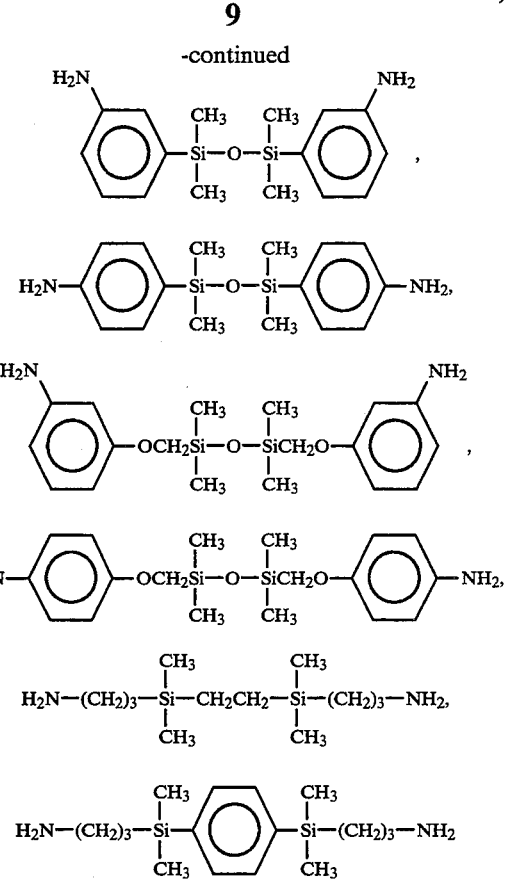

Y may be one or a mixture of the foregoing diamine residues. Therefore, either a single diamine or a mixture of two or more diamines may be used in producing the polyimide of formula (3) or (4).

Z is a divalent organic group containing an aromatic ring, which originates from the aminocarboxylic acid of formula (8) which is used as a starting reactant to form the polyimide of formula (3). Examples of the aminocarboxylic acid are p-, m- and o-aminobenzoic acids though not limited thereto. Z may be one aminocarboxylic acid residue or a mixture of aminocarboxylic acid residues, which means that aminocarboxylic acids of formula (8) may be used alone or in admixture of two or more in preparing polyimides of formula (3).

W is a trivalent organic group containing an aromatic ring, which originates from the tricarboxylic acid anhydride of formula (9) which is used as a starting reactant to form the polyimide of formula (4). Trimellitic anhydride is a typical example of the tricarboxylic acid anhydride.

The silicon compound to be reacted with the polyimide of formula (3) or (4) is an isocyanatosilane of the following structural formula (5).

In formula (5), $R^1$ and $R^2$, which may be the same or different, are substituted or unsubstituted monovalent hydrocarbon groups having 1 to 10 carbon atoms, preferably 1 to 6 carbon atoms, for example, alkyl groups such as methyl, ethyl, propyl and butyl groups; alkenyl groups such as vinyl, allyl and butenyl groups; aryl groups such as phenyl and tolyl groups; and substituted ones of these groups wherein some or all of the hydrogen atoms attached to carbon atoms are replaced by halogen atoms, cyano groups, alkoxy groups or the like, for example, chloromethyl, chloropropyl, 3,3,3-trifluoropropyl, 2-cyanoethyl, methoxyethyl, and ethoxyethyl groups. Among these, alkyl groups and alkoxy-substituted alkyl groups are preferred for $R^1$ and substituted or unsubstituted alkyl and aryl groups are preferred for $R^2$.

$R^3$ is a divalent organic group, more specifically a divalent substituted or unsubstituted hydrocarbon group, for example, alkylene groups such as

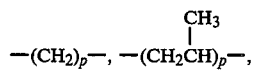

arylene groups such as

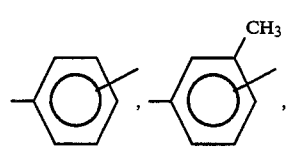

substituted alkylene groups such as oxyalkylene and iminoalkylene groups as represented by

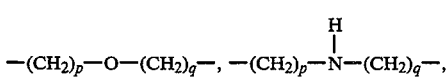

substituted alkylenearylene groups such as oxyalkylenearylene and iminoalkylenearylene groups as represented by

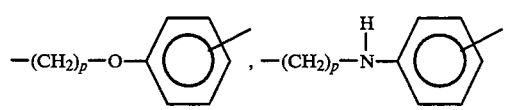

wherein p and q are integers of 1 to 3.

Illustrative, non-limiting examples of the silicon compound of formula (5) are given below.

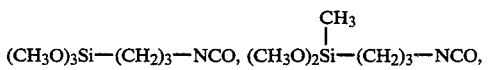

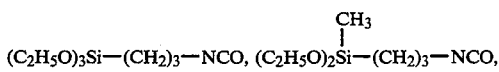

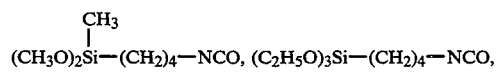

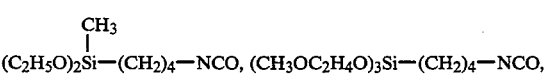

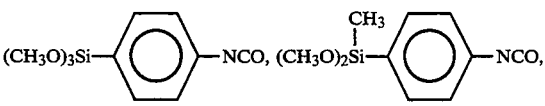

-continued

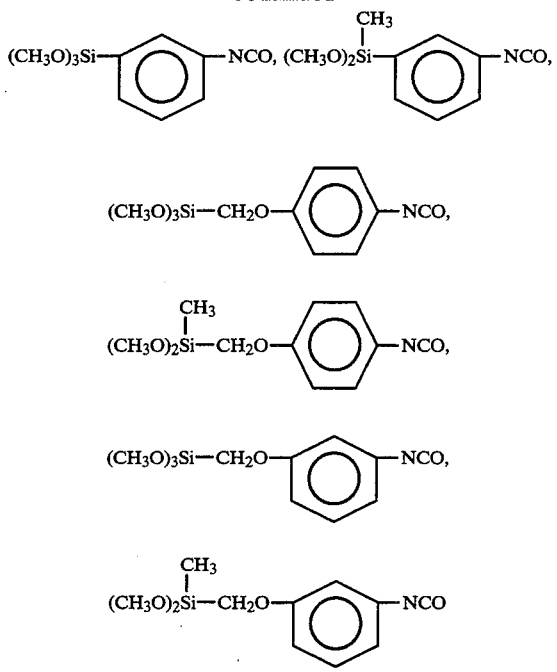

In the practice of the invention, the silicon compounds may be used alone or in admixture of two or more.

The reaction between a polyimide of formula (3) or (4) and a silicon compound of formula (5) to form a curable resin of formula (1) or (2) according to the present invention is carried out in an organic solvent.

Examples of the solvent include N-methyl-2-pyrrolidone, dimethylacetamide, dimethylformamide, hexamethylphosphramide, tetrahydrofuran, 1,4-dioxane, methyl cellosolve, butyl cellosolve, diglyme (diethylene glycol dimethyl ether), triethylene glycol dimethyl ether, diethylene glycol diethyl ether, acetone, methyl ethyl ketone, methyl isobutyl ketone, cyclopentanone, cyclohexanone, toluene, xylene, alone and in admixture of two or more. The organic solvent is preferably used in amounts to provide a resin solids content of about 2 to 40%, especially about 5 to 30% by weight.

On reaction, the silicon compound of formula (5) and the polyimide of formula (3) or (4) are preferably used in a molar ratio (5)/(3) or (5)/(4) of from about 1.9 to about 2.1. The reaction temperature is preferably -−20° C. to 100° C., often 0° C. to 80° C. The reaction time is about ½ to 10 hours. The reaction takes place either in the presence or absence of a catalyst. The catalyst, when used, may be selected from tertiary amines, for example, triethylamine, ethylenediamine and benzyldimethylamine. It is used in a catalytic amount.

The curable resin of formula (1) or (2) according to the present invention is used in the form of a solution in a suitable solvent when it is desired to apply the resin as protective films on electronic parts. The solvent may be selected from the aforementioned ones alone or in admixture of two or more. Preferably the solvent is added to the resin to provide a resin solid content of about 1 to 60% by weight, especially about 2 to 40% by weight. The resin remains fully stable in the solution during shelf storage and the solution has a low viscosity enough to work with.

Cured films are generally obtained from the solution of curable resin of formula (1) or (2) by heating at a temperature of 100° C. to 300° C., preferably 150° C. to 300° C. for about 1 to about 10 hours, whereby the alkoxysilyl group undergoes crosslinking reaction with water in the solution or atmosphere. As a result, the resin cures into a high molecular weight polymer having an imide group which exhibits improved heat resistance, mechanical properties, electrical properties, adherence to substrates, and solvent resistance.

The curable resin of the invention will find a wide variety of applications as coatings or films on various substrates, typically semiconductor devices, for example, passivation films and protective films on semiconductor element surface, protective films over diode and transistor junctions, α-radiation shielding films on VLSI, interlayer insulating films ion implantation masks, conformal coatings on printed circuit boards, orienting films of liquid crystal display elements, glass fiber protective films, and solar battery surface protective films. In addition, the curable resin solution may be blended with inorganic fillers to form printing paste compositions or with conductive fillers to form conductive paste compositions.

There has been described a curable resin which is dissolved in an organic solvent to form a less viscous and fully shelf stable solution and which can be cured onto substrates at relatively low temperatures below 300° C. to form coatings having excellent heat resistance, mechanical strength, electrical properties, solvent resistance, and adherence. The curable resin is useful in forming protective films on electronic parts, typically semiconductor devices. The process of the present invention ensures simple and consistent manufacture of such a curable resin.

EXAMPLE

Examples of the present invention are given below by way of illustration and not by way of limitation.

Example 1

A flask equipped with a stirrer, thermometer, and nitrogen purge tube was charged with 22.2 grams (0.05 mol) of 2,2-bis(3,4-benzene dicarboxylic anhydride)perfluoropropane and 200 grams of N-methyl-2-pyrrolidone as a solvent. To the flask, 80 grams of a solution containing 8.0 grams (0.04 mol) of diaminodiphenyl ether and 2.7 grams (0.02 mol) of p-aminobenzoic acid in N-methyl-2-pyrrolidone was gradually added dropwise. After the completion of addition, agitation was continued for a further 10 hours at room temperature. The flask was equipped with a reflux condenser connected to a water receiver, 30 grams of xylene was added to the flask, and the reaction system was heated to 160° C. and maintained at the temperature for 6 hours. This reaction yielded 1.7 grams of water.

The resulting yellow brown reaction solution was cooled down and poured into methanol for re-precipitation. On drying, there was obtained 30.4 grams of a polyimide compound of the following structural formula.

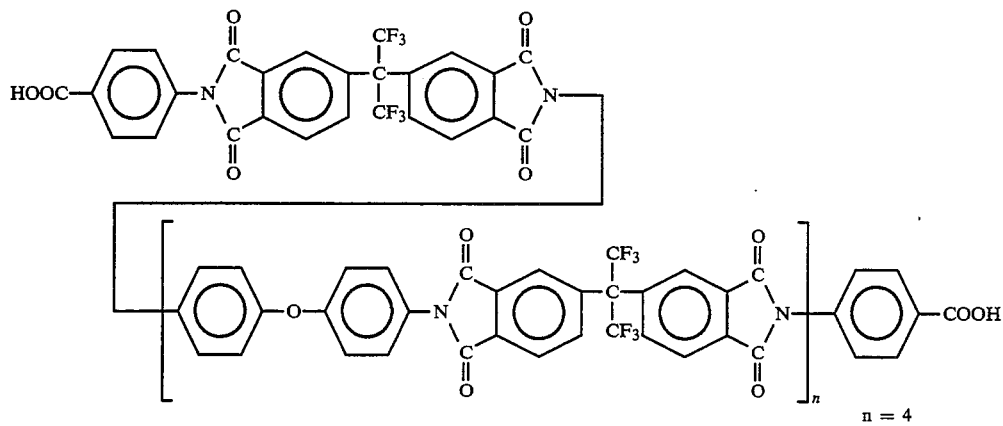

On observation of this polyimide compound by infrared absorption spectroscopy, absorption peaks attributable to imide bond appeared at 1770 and 1720 cm$^{-1}$.

Then 26.3 grams of the polyimide compound was again dissolved in N-methyl-2-pyrrolidone, and 4.0 grams (0.016 mol) of 3-isocyanatopropyltriethoxysilane as a silicon compound and 0.1 grams of triethylamine catalyst were added thereto. Agitation was continued for 10 hours at room temperature while carbon dioxide gas evolved. Then the reaction solution was poured into methanol, obtaining 27.2 grams of a reaction product of the following structural formula.

Example 2

The procedure of Example 1 was repeated except that the initial charge was 20.4 grams (0.048 mol) of 1,3-bis(3,4-dicarboxyphenyl)-1,1,3,3-tetramethyldisiloxane dianhydride and 200 grams of diethylene glycol dimethyl ether as a solvent, and 60 grams of a solution containing 14.8 grams (0.036 mol) of 2,2-bis[4-(4-aminophenoxy)phenyl]propane and 3.3 grams (0.024 mol) of m-aminobenzoic acid in diethylene glycol dimethyl ether was added thereto. A solution of an imide compound was obtained.

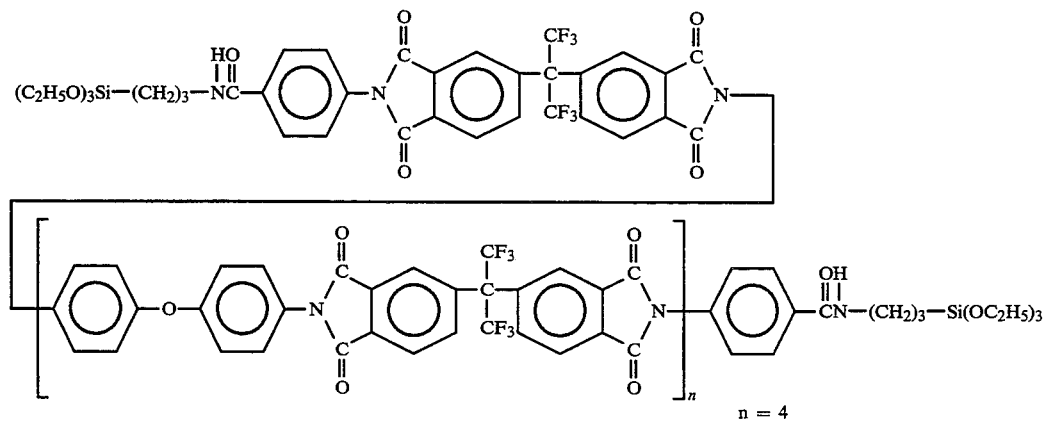

On observation of this product by infrared absorption spectroscopy, an absorption peak at 2300 cm$^{-1}$ attributable to isocyanato did not appear, but an absorption peak at 1640 cm$^{-1}$ attributable to amide bond appeared, ascertaining the formation of an end curable resin.

To the solution, without isolating the imide compound, were added 5.2 grams (0.024 mol) of 3-isocyanatopropylmethyldiethoxysilane as a silicon compound and 0.05 grams of triethylenediamine. There was obtained 38.2 grams of an end curable resin of the following structural formula.

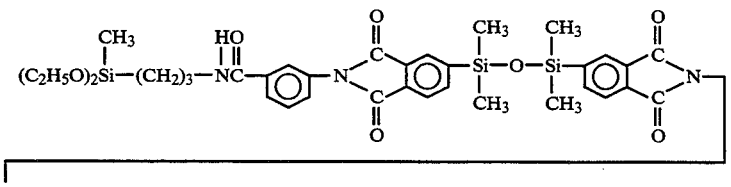

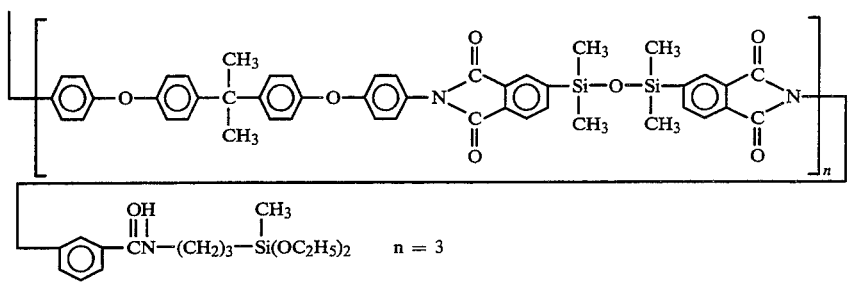

Example 3

The procedure of Example 1 was repeated except that the initial charge was 14.71 grams (0.05 mol) of 3,3',4,4'-biphenyltetracarboxylic dianhydride and 200 grams of N-methyl-2-pyrrolidone as a solvent, and 60 grams of a solution containing 4.1 grams (0.01 mol) of 2,2-bis[4-(4-aminophenoxy)phenyl]propane, 7.5 grams (0.03 mol) of 1,3-bis(3-aminopropyl)-1,1,3,3-tetramethyldisiloxane and 2.8 grams (0.02 mol) of m-aminobenzoic acid in N-methyl-2-pyrrolidone was further added. To the imide compound solution was added 4.8 grams (0.02 mol) of 3-isocyanatophenyltrimethoxysilane.

There was obtained 28.8 grams of an end curable resin of the following structural formula.

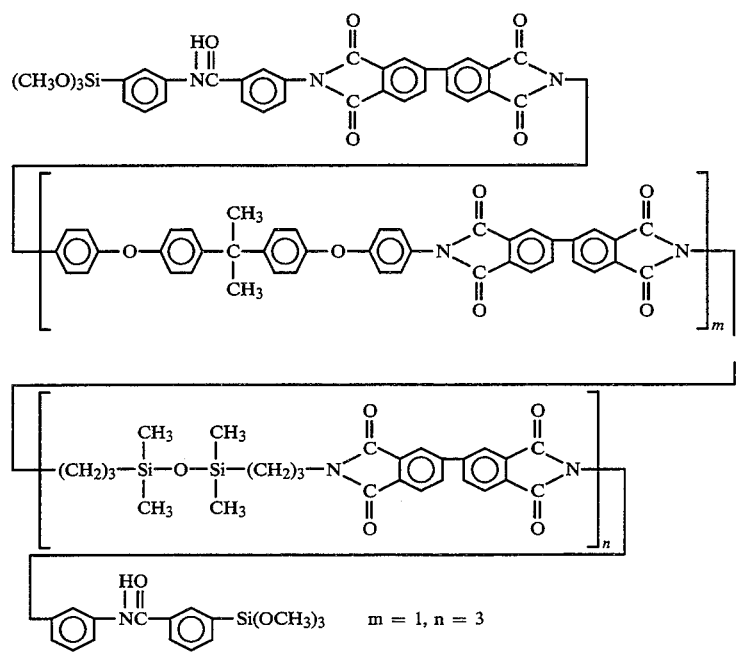

Example 4

In accordance with the procedure of Example 1, 17.8 grams (0.04 mol) of 2,2-bis(3,4-benzenedicarboxylic anhydride)perfluoropropane, 3.8 grams (0.02 mol) of trimellitic anhydride and 10.0 grams (0.05 mol) of di-aminodiphenyl ether were reacted in 200 grams of N-methyl-2-pyrrolidone. There was obtained 31.2 grams of a polyimide compound of the following structural formula.

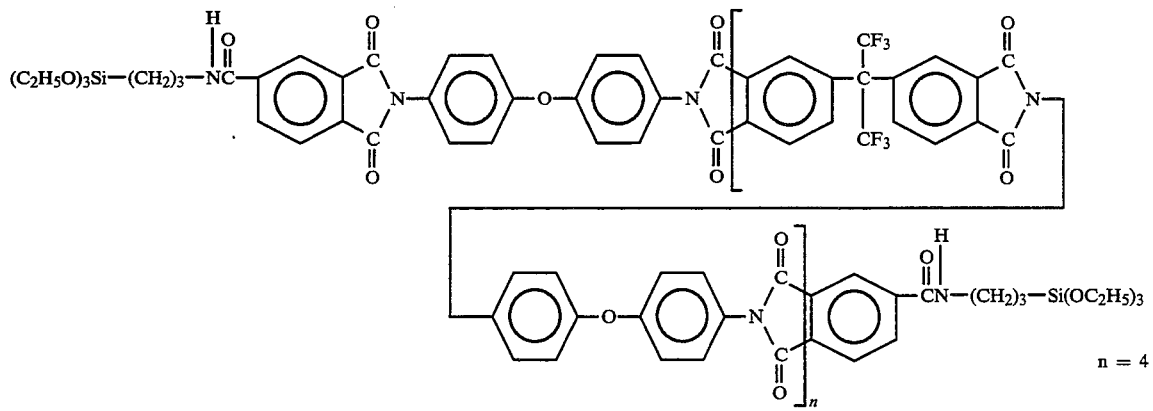

To the N-methyl-2-pyrrolidone solution of the polyimide compound was added 4.9 grams (0.02 mol) of 3-isocyanatopropyltriethoxysilane. The resulting polyimide compound had the following structural formula.

There was obtained a solution of an aminosilicon compound-containing polyamic acid.

Comparative Example 2

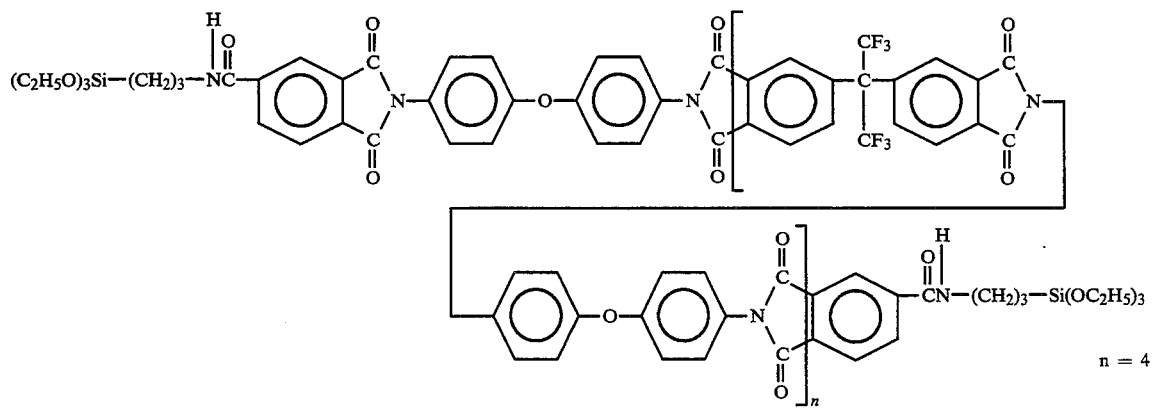

Comparative Example 1

22.2 grams (0.05 mol) of 2,2-bis(3,4-benzenedicarboxylic anhydride)perfluoropropane and 10.0 grams (0.05 mol) of diaminodiphenyl ether were reacted in 295 grams of N-methyl-2-pyrrolidone at room temperature, obtaining polyamic acid solution. To the solution was added 0.6 grams of 3-aminopropyltriethoxysilane.

22.2 grams (0.05 mol) of 2,2-bis(3,4-benzenedicarboxylic anhydride)perfluoropropane and 8.0 grams (0.04 mol) of diaminodiphenyl ether were reacted in 310 grams of N-methyl-2-pyrrolidone at room temperature, obtaining a polyamic acid solution. To the solution was added 4.4 grams (0.02 mol) of 3-aminopropyltriethoxysilane. There was obtained a solution of a polyamic acid having an alkoxysilyl group at each end as shown by the following structural formula.

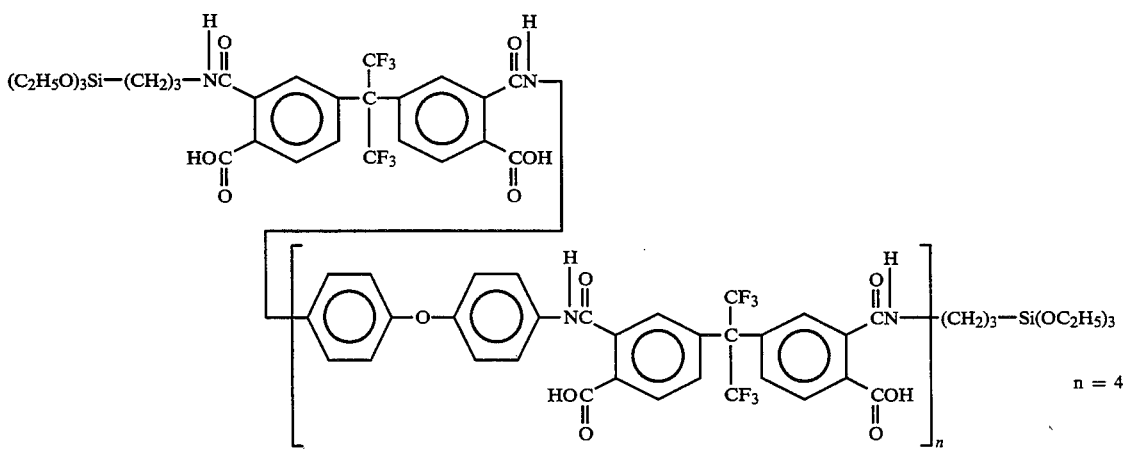

Tests were carried out on solutions of the curable resins of Examples 1, 3 and 4 in N-methyl-2-pyrrolidone, a solution of the curable resin of Example 2 in diglyme, and the solutions of Comparative Examples 1 and 2. In the shelf stability test, the solutions were measured for viscosity (centistoke at 25° C.) by means of an Ostwald viscometer at the initial and after they were allowed to stand for 3 months at 25° C. In the adhesion test, the solutions were applied to silicon dioxide substrates, allowed to stand for 3 hours, and heated at 150° C. for one hour and then at 300° C. for a further one hour. The adhesion of the cured films to the substrates was examined by a scribed adhesion test. Solvent resistance was examined by immersing the cured films in N-methyl-2-pyrrolidone for one minute. The results are shown in Table 1.

TABLE 1

| Example | Solvent | Solution viscosity (cs), 3-month/initial | Cured film Adhesion | Cured film Solvent resistance |
|---|---|---|---|---|
| E1 | N-methyl-2-pyrrolidone | 5/5 | 100/100 | Good |
| E2 | diglyme | 4/4 | 100/100 | Good |
| E3 | N-methyl-2-pyrrolidone | 5/5 | 100/100 | Good |
| E4 | N-methyl-2-pyrrolidone | 5/5 | 100/100 | Good |
| CE1 | N-methyl-2-pyrrolidone | gelled | 100/100 | Good |
| CE2 | N-methyl-2-pyrrolidone | gelled | 100/100 | Good |

As is evident from Table 1, the resins of Examples 1 to 4 form solutions which remain stable during shelf storage and cure at temperature of about 300° C. into films having firm bond to substrates and excellent solvent resistance.

Although some preferred embodiments have been described, may modifications and variations may be made thereto in the light of the above teachings. It is therefore to be understood that within the scope of the appended claims, the invention may be practiced otherwise than as specifically described.

We claim:

1. A curable resin having the following structural formula

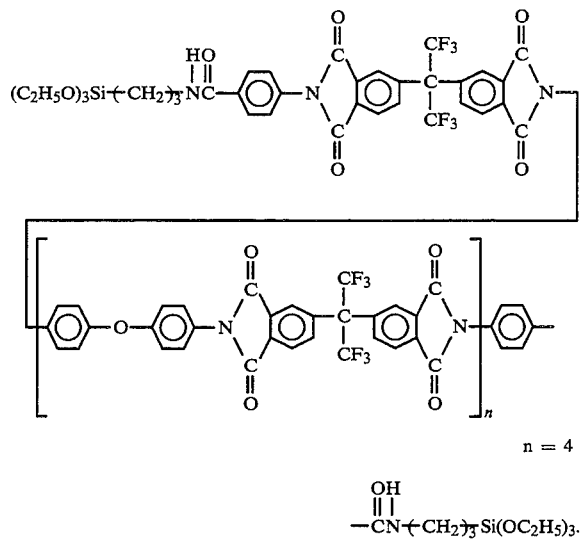

2. A curable resin having the following structural formula

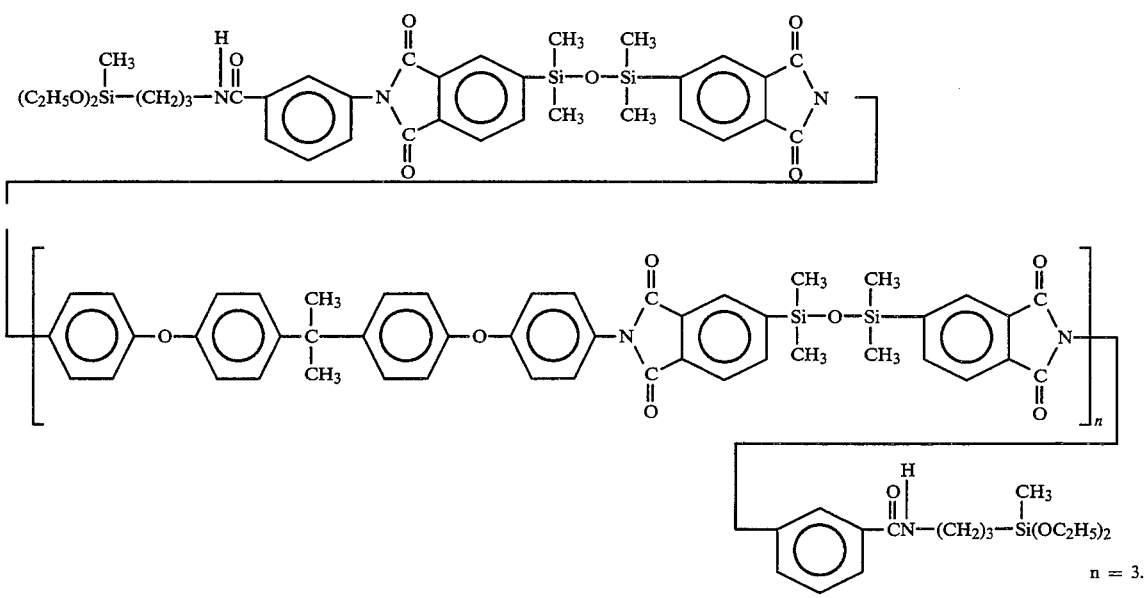

3. A curable resin having the following structural formula

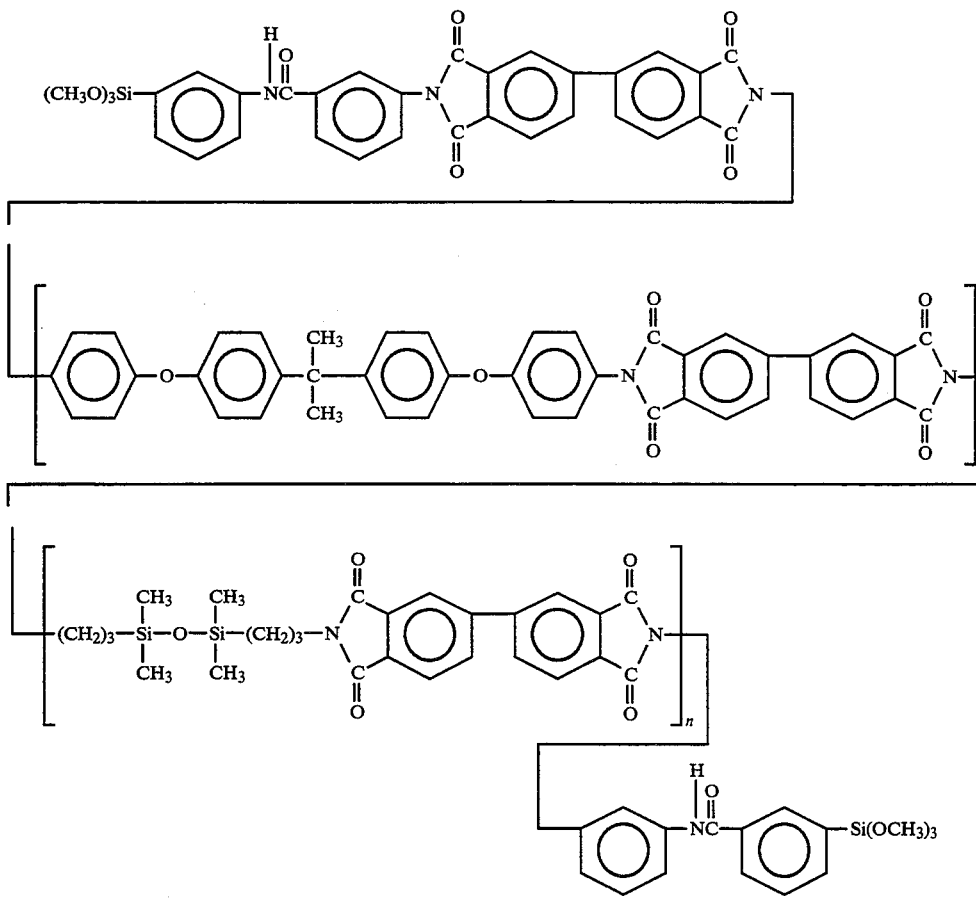
4. A curable resin having the following structural formula
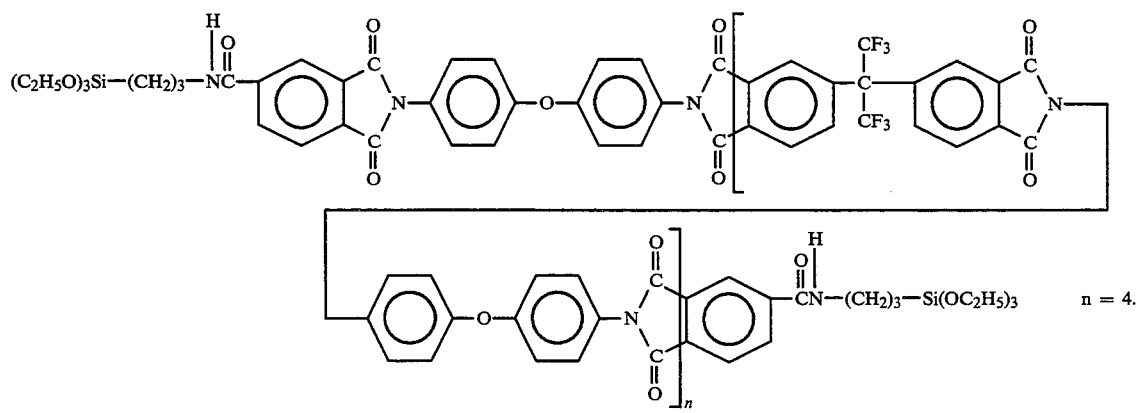
* * * * *